A. LATSHAW.
DIRECTION INDICATOR FOR VEHICLES.
APPLICATION FILED DEC. 5, 1919.
1,380,982.
Patented June 7, 1921.
2 SHEETS—SHEET 2.
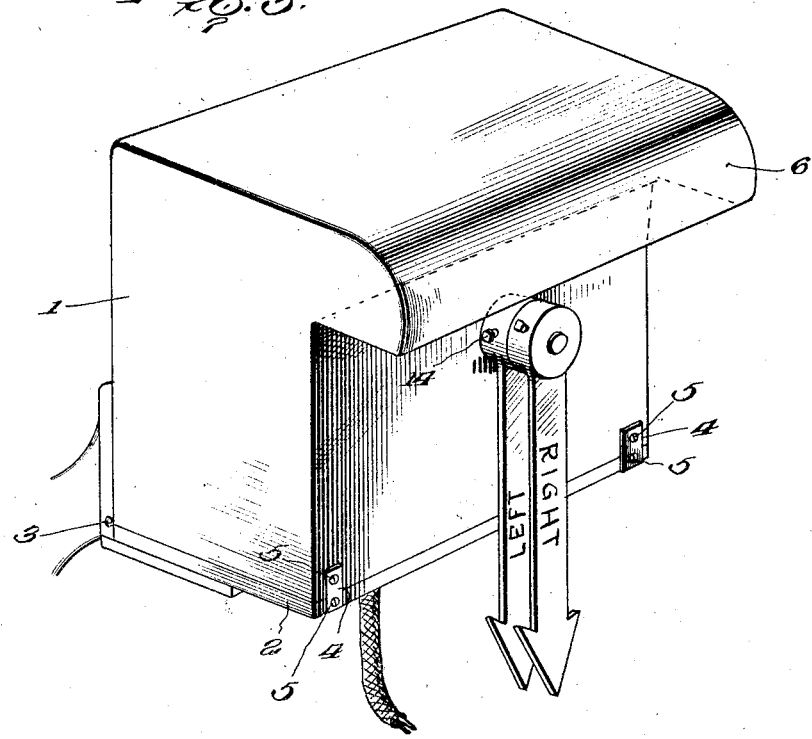
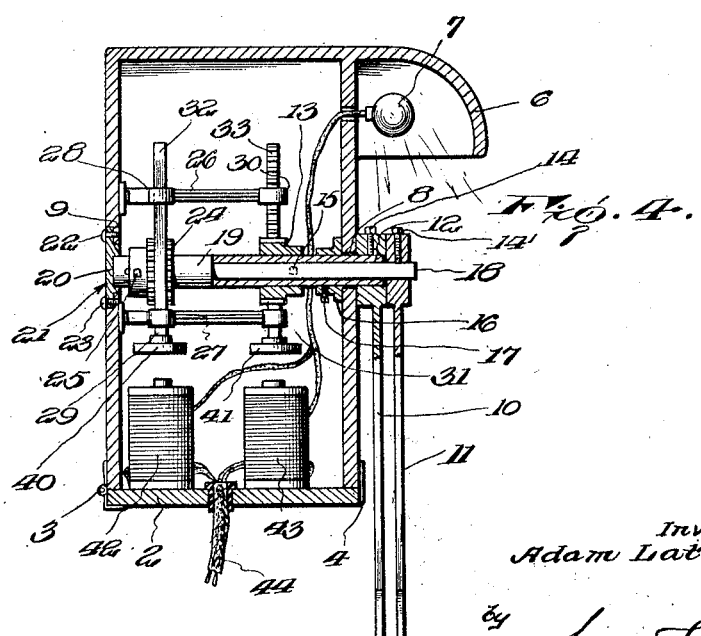
Inventor.
Adam Latshaw.
by
his Atty.

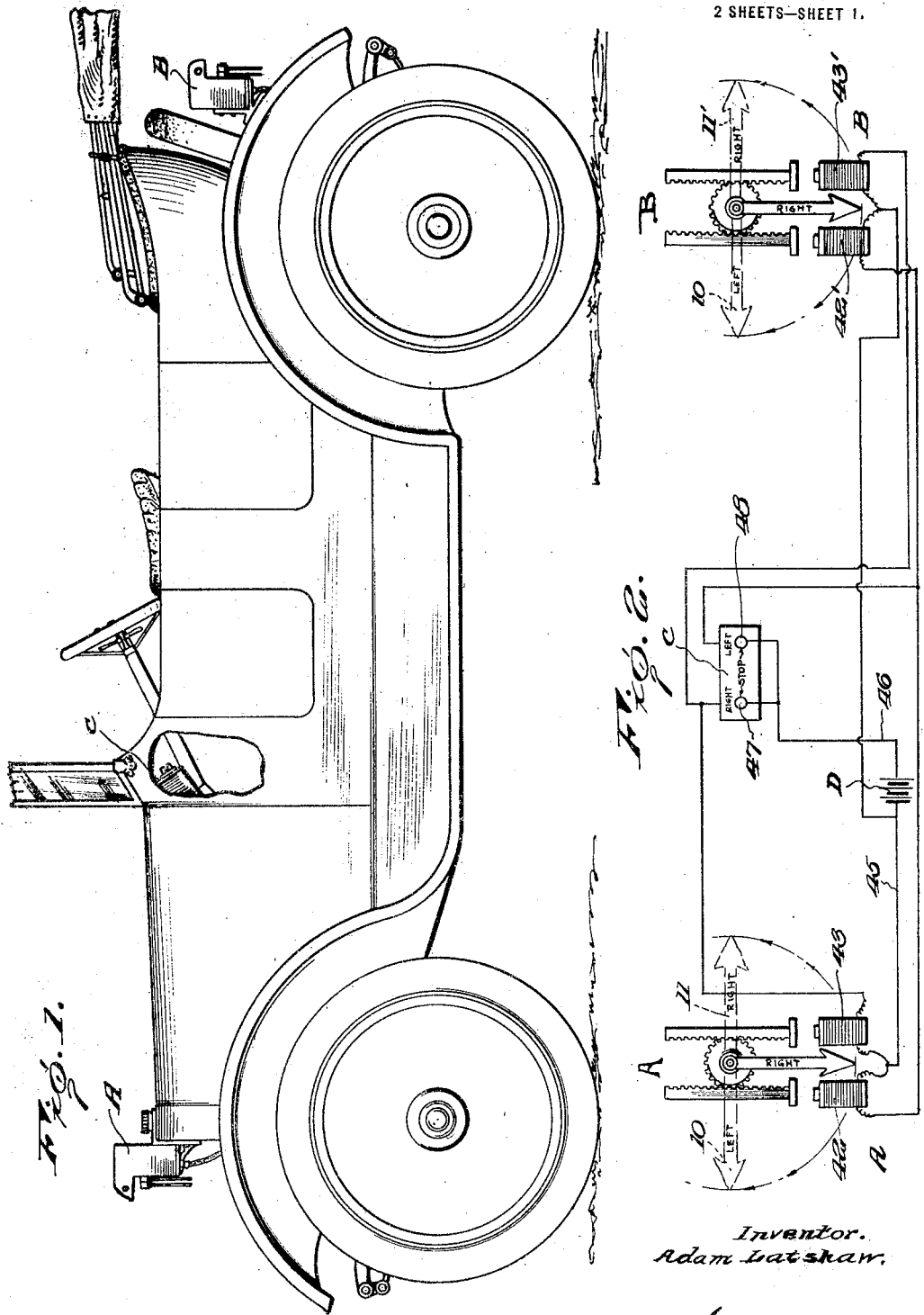

UNITED STATES PATENT OFFICE.

ADAM LATSHAW, OF DUBOIS, PENNSYLVANIA.

DIRECTION-INDICATOR FOR VEHICLES.

1,380,982.      Specification of Letters Patent.      Patented June 7, 1921.

Application filed December 5, 1919. Serial No. 342,704.

*To all whom it may concern:*

Be it known that I, ADAM LATSHAW, a citizen of the United States, residing at Dubois, in the county of Clearfield and State of Pennsylvania, have invented certain new and useful Improvements in Direction-Indicators for Vehicles, of which the following is a specification.

This invention relates to a direction indicator for vehicles. In providing a direction indicator for vehicles it is a general object to accomplish the function of warning the driver of a vehicle approaching from the rear that the vehicle in front is either going to stop, move to the right or move to the left. This is generally done by means of a series of elements which indicate in words, by lights, or otherwise the intentions of the driver of the vehicle.

An object of the present invention is to provide a device of the above described character which may be arranged on a vehicle in such manner that it will not only warn the driver of a vehicle approaching from the rear but will also warn pedestrians and other vehicles approaching in an opposite direction of the intentions of the driver having in charge the vehicle which is equipped with the device.

This invention also has for one of its objects the provision of a direction indicating device by which two different directions may be indicated both at the front and rear of the vehicle or a complete stop may be indicated.

Another feature of the invention is to provide a device in which the direction indicating elements are controlled in their movement to indicate a change of direction by electrical means and upon the deënergization of such electrical means the indicating elements return by gravity to their normal non-indicating position thus making a very simple and compact construction.

Still another feature of the invention is to provide means for illuminating the indicating members so that the indicator may be as useful at night as in the day.

In the drawings:

Figure 1 is a side elevation of an automobile equipped with the invention;

Fig. 2 is a diagrammatic view showing the circuits;

Fig. 3 is a view in perspective of one unit of the indicator, and

Fig. 4 is a transverse section in a vertical plane of the unit shown in Fig. 3.

The direction indicator comprises two units A and B, identical in construction except for the brackets by means of which they are applied to the vehicle; that is to say, one unit A is attached at the front of the car as for instance to the neck of the radiator as shown in Fig. 1, and the other unit B is attached to the left hand rear mud guard as shown, or may be attached to the center rear portion of the car as for instance, in the center of the usual tire carrier provided on the rear of the car. A selector switch C for operating the units A and B may be located on the dash as shown in Fig. 1 or on the steering wheel of the vehicle dependent on the wishes of the party applying the device to the vehicle.

Since the units A and B are identical in construction only one will be described. With reference to Figs. 3 and 4 the indicating unit comprises a casing 1 of any suitable material having a bottom 2 hinged at 3 and which may be held in its normal closed position by clips 4 secured in place by screws 5 or other means. The casing 1 may be of rectangular form provided at its forward side with a hood 6 in one end of which is located an incandescent light 7 connected with the usual lighting circuit of an automobile and preferably operated by the same switch as operates the tail light of the vehicle. The forward side of the casing 1 is apertured as at 8 and the rear wall also is apertured and countersunk as at 9 in alinement with the aperture 8. The indicating means comprises two superposed dependent arrow members 10 and 11, the former of which is mounted on a hollow shaft 12 extending through the aperture 8 and carrying a gear 13. The arrow 10 is fastened in place on said shaft 12 by means of a set screw 14 and the gear 13 is similarly fastened by a set screw 15 while a collar 16 fastened by a set screw 17 abuts the rear side of the front wall of the casing 1 to prevent forward displacement of the shaft 12. Concentric with the shaft 12 is a second shaft 18 which has an enlarged rear portion 19 abutting the rear end of the shaft 12 to prevent displacement of said shaft and the rear end of the enlarged portion 19 seats in a step bearing 20 in a plate 21 secured in place by screws 22, said plate 21 seating in the countersunk aperture 9 of the rear wall of the casing 1. A gear 24 similar to the gear 13 is carried by the enlarged portion 19 of the shaft 18 and held in place by a suitable set screw 25. It will be seen from this construction that if the two shafts 12 and 18 are oscillated in opposite directions the arrow members 10 and 11 will move to a position at right angles to the position shown in Fig. 3.

In order to accomplish the movement of the direction indicating members 10 and 11 as above outlined there is carried on the rear face of the casing 1 two horizontally extending supports 26 and 27 which have bearings 28, 29 and 30, 31 receiving vertically reciprocable rack members 32 and 33 having armature heads 40 and 41, respectively. These racks are so positioned that when the direction indicating members 10 and 11 are in the position shown in Fig. 3 the racks will be elevated. Beneath the racks 32 and 33 and alining with the armatures 40 and 41 are solenoids 42 and 43, respectively, which, upon energization serve to elevate the direction indicating members 10 and 11 to the position indicated diagrammatically in Fig. 2 which indicates a stop of the vehicle on the part of the driver. The energization of the solenoid 42 or the solenoid 43 separately will throw the corresponding direction indicating member 10 or 11 into the horizontal or lateral position and upon the deënergization of such solenoid the weight of the direction indicating member will serve to overbalance the weight of the armature 40 or 41 as the case may be and said rack and direction indicating member will return to their normal position as shown in Fig. 4. An armored cable 44 containing wires leading to the solenoids 42 and 43 and to the light 7 may be employed for the purpose of connecting the units A and B to the source of electrical energy and the switch for controlling the same. With particular reference to Fig. 2 wherein is shown the diagrammatic set-up and circuits of the direction indicator units A and B which comprises the solenoids 42, 43 and 42', 43', respectively, with their respective racks, pinions and right and left hand indicating members 10 and 11 and 10' and 11', respectively; a source of electrical energy D is connected with a wire 45 common to both pairs of solenoids 42, 43 and 42', 43' while the other pole of said source of electrical energy D is connected by a wire 46 with one side of each button 47, 48 of switch C, the other sides of said switch being connected in the following manner: The right hand side of the switch C indicated by button 47 is connected to the remaining terminal of right hand solenoid 43 of unit A and right hand solenoid 43' of unit B while the left hand circuit of the switch C indicated by button 48 is connected with the remaining terminal of left hand solenoid 42 of unit A and left hand solenoid 42' of unit B. With this arrangement and the parts in the position indicated in Fig. 2 diagrammatically, if the right hand button 47 is pressed the circuit will be formed through the solenoids 43 and 43' with the result that the armatures which are directly over said solenoids, will be drawn down drawing up the right hand direction indicating members of each unit A and B simultaneously whereas if left hand button of switch C is depressed the left hand solenoids 42 and 42' will be energized throwing up the left hand direction indicating members or if both buttons are pressed both circuits in all solenoids will be energized throwing up both direction indicating members of both units A and B with the result that a stop is indicated to persons approaching either from the front or the rear of the vehicle carrying the direction indicating device.

I claim:

The combination of a casing, a hollow shaft journaled in and extending through one wall of the casing, a second shaft journaled at one end in the opposite wall of the casing and having its opposite end extending through and beyond the hollow shaft, said second shaft having an annular shoulder abutting the inner end of the hollow shaft, a collar secured on the hollow shaft and abutting the inner side of the wall of the casing, indicator arms secured on the outer ends of the shafts, a gear on each shaft within the casing, racks mounted in the casing at opposite sides of the shafts, each rack meshing with one of the gears, and means for actuating said racks.

In testimony whereof I affix my signature.

ADAM LATSHAW. [L. S.]